Figure 1:
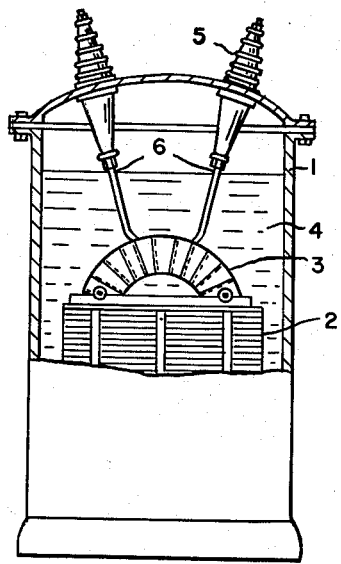

Dec. 10, 1963  G. R. WILSON ETAL  3,113,993
ELECTRICAL DEVICES COMPRISING BIPHENYLYL SILICATE
Filed May 17, 1961

DIELECTRIC METAL
CONTAINING ELECTRODES TETRAKIS
(O-BIPHENYLYL) SILICATE

METAL FOIL

PAPER IMPREGNATED WITH TETRAKIS
(O-BIPHENYLYL) SILICATE

*INVENTORS*
GEORGE L. BALL, III
GLENN R. WILSON
BY

*Mary B. Mosher*

AGENT

United States Patent Office 3,113,993
Patented Dec. 10, 1963

3,113,993
ELECTRICAL DEVICES COMPRISING
BIPHENYLYL SILICATE
Glenn R. Wilson, Cambridge, and George L. Ball III, Medford, Mass., assignors, by mesne assignments, to Monsanto Research Corporation, Everett, Mass., a corporation of Delaware
Filed May 17, 1961, Ser. No. 110,708
6 Claims. (Cl. 174—17)

The present invention relates to electrical devices and more particularly deals with apparatus comprising a combination of electricity conducting elements and dielectric insulating and encapsulating medium therefor.

The use of a dielectric is required in certain electrical equipment for the purpose of removing heat and of allowing the making of electrical contact in the absence of air or of explosive mixtures. The requirements for such dielectrics are among other things very high resistance to the flow of electric currents, high stability to atmospheric conditions at ordinary and at somewhat elevated temperatures, high resistances to thermal decomposition, low coefficient of thermal expansion, low vapor pressure, low congealing temperature, low inflammability and high flash point. Preferably the dielectric should be a mobile liquid even at relatively low temperatures and should be a good heat transfer agent. A satisfactory dielectric should not sludge or undergo deleterious change during use. For example, when a capacitor is impregnated with a thermally unstable dielectric, under high operating temperatures and direct current voltages, deterioration of the dielectric results in an ever increasing current leakage, a short capacitor life, corrosion of the electrodes, etc. Moreover, in the case of capacitors operating on alternating current, the decomposition sometimes results in an excessive increase in power factor of the dielectric material.

It is, therefore, an object of the present invention to provide a method for the insulation of elements in electrical apparatus wherein the above objectionable properties are either completely eliminated or substantially reduced. An additional object is to provide transformers, capacitors, circuit breakers, cables, switches, fuses, reactors, regulators and the like wherein the deleterious effects caused by unstable dielectric material, such as the deterioration of metal parts, paper insulation, etc., is eliminated or materially reduced. Still another object is to provide electrical apparatus having a long, useful life and good dielectric stability. A further object is to provide a means for suppressing corona discharge in capacitors. Still a further object is the provision of a liquid dielectric composition suitable for encapsulating, i.e., potting, electronic circuits or components, which composition dissipates (without thermal decomposition) the heat generated within the electronic circuits, e.g., hot power tubes, and at the same time is impervious to moisture of the atmosphere. An important objective of the invention is the provision of encapsulated electrical equipment, for instance, transformers, motor stators, coils, printed circuits, etc.

Figure 2:
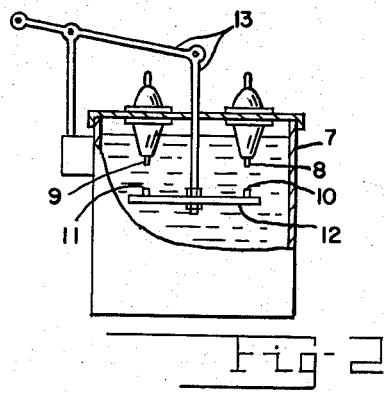
Figure 4:
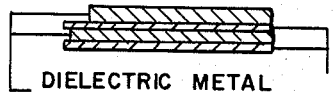
Figure 5:
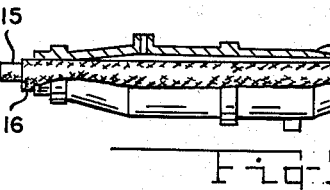
Figure 3:
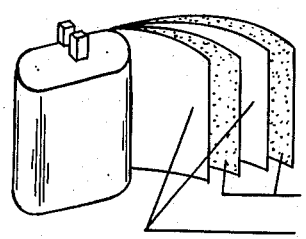

According to the invention, these and other objects which will be hereinafter disclosed are provided by the following invention wherein there is provided electrical apparatus comprising, in combination, conducting elements disposed in spaced relationship to each other and adapted during operation of the apparatus to have a difference in electrical potential therebetween, and tetrakis(biphenylyl) silicate interposed between said elements for insulating one from the other as illustrated in the several figures wherein FIGURE 1 is a partial sectional elevational view of a transformer immersed in the dielectric medium of the invention; FIGURE 2 is a similar view of a switch assembly; FIGURES 3 and 4 illustrate in a perspective view and a sectional view, respectively, of a capacitor utilizing the dielectric medium of the invention; and FIGURE 5 is a partial sectional view of a cable. The insulating agent, i.e., the dielectric medium, of the present apparatus is advantageously one wherein the liquid portion of which consists of at least 50% by weight of a tetrakis(biphenylyl) silicate with a liquid range above 79° C.

The presently useful compounds, i.e., tetrakis(o-, m- and p-biphenylyl) silicates

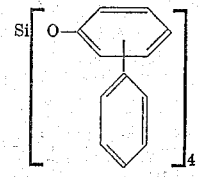

are readily obtainable in known manner by heating silicon tetrachloride with o-, m- or p-phenylphenol

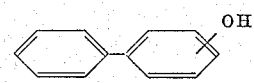

or a lower alkyl ether thereof such as o-, m- or p-biphenylyl methyl ether

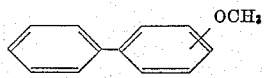

advantageously at a temperature of over 200° C.

We have found that electrical apparatus comprising tetrakis(biphenylyl) silicate as dielectric or encapsulating medium are not only resistant to deterioration by ordinary atmospheric conditions, e.g., air and moisture, but that they are distinguished by resistance to very high temperatures. At operating temperatures which may be, say, up to 475° C., excellent dielectric properties are maintained and low dissipation factors are demonstrated.

Evaluation of the dielectric constant and of the dissipation factor of tetrakis(o-biphenylyl) silicate was conducted as follows. The test apparatus was a high temperature liquid cell used in conjunction with a bridge network. The cell was a concentric cylindrical capacitor of gold-plated Monel metal using quartz to insulate the electrodes from each other. Connecting lines were commercially available low loss lines to assure rigid reproducibility in the capacitance of the test cells, and adaptors were employed instead of conventional pin connectors. The connecting lines were free of any material, e.g., insulating beads, which might be degraded at the high temperatures employed for the tests. The temperature measurements were made with an accuracy of ±5° C. This limit of accuracy represented the maximum temperature difference between the inner and outer electrodes of the cell. There was thus determined dielectric constant values of 3.03 to 2.46 at 100 kc. over the temperature range of 65° C. to 450° C. and dissipation factor values varying from 0.014% to 0.42% over the same temperature range and at the same frequency.

That no substantial variation in dielectric constant results from a change in frequency is shown by the following values obtained with tetrakis(o-biphenylyl) silicate at the frequencies and temperatures shown below:

| Temperature, °C. | Dielectric Constant, at— | | |
|---|---|---|---|
| | 1 kc. | 10 kc. | 100 kc. |
| 65 | 3.03 | 3.03 | 3.03 |
| 100 | 2.96 | 2.95 | 2.95 |
| 175 | 2.82 | 2.81 | 2.81 |
| 200 | 2.78 | 2.76 | 2.76 |
| 250 | 2.69 | 2.68 | 2.68 |
| 300 | 2.62 | 2.61 | 2.61 |
| 350 | 2.57 | 2.55 | 2.55 |
| 400 | 2.56 | 2.50 | 2.50 |
| 425 | 2.59 | 2.48 | 2.48 |
| 450 | 2.66 | 2.47 | 2.46 |

The very good thermal stability of the tetrakis(o-biphenylyl) silicate was determined by aging at 350° C. for 1936 hours. Only negligible changes in dielectric constant were noted.

The dielectric strength of tetrakis(o-biphenylyl) silicate when employed in electrical apparatus destined for use at high temperatures was determined by modifying the apparatus used in the American Society for Testing Materials (ASTM) Method D-877-49 for measurement of dielectric breakdown. The modifications were as follows: Spherical electrodes, 0.5" in diameter and spaced 0.040" ±0.0001" apart were used instead of flat electrodes with 0.1" spacing. The breakdown voltage was measured by increasing the voltage across the gap at a rate of 500 volt/second until a break occurred. Correlation between the values obtained with the ASTM cell and the presently employed modified cell was arrived at from a long series of experiments. Those determined with the modified cell were very approximately ½ of the values obtained with the ASTM cell. Employing tetrakis(o-biphenylyl) silicate with the modified cell, dielectric strength values on the ASTM scale were found to be 49 kv. at 100° C. and decreasing to 40 kv. at 300° C.

The isomeric tetrakis(biphenylyl) silicates are of general utility as dielectric media when interposed in electrical apparatus between metallic conducting elements that have a difference in potential during operation of the apparatus. They are valuable as liquid impregnants in capacitor and cable manufacture, as transformer coolants, in the fabrication of switch gear, etc.

Characteristics of the tetrakis(biphenylyl) silicates are such as to render them useful as impregnants for cellulosic materials, e.g., wood pulp, paper, cotton, cotton fabric, cellulose acetate fibers and textiles, whereby there are obtained materials which possess dielectric constants that are higher than that of either the cellulosic material before impregnation or of the liquid dielectric. However, since these silicates are distinguished by resistance to very high temperatures, i.e., temperatures which are not generally tolerated by the cellulosic materials, the more profitable utilization of the tetrakis(biphenylyl) silicates is in connection with the type of materials encountered in high temperature applications, e.g., ceramic and other refractory materials, mica, fused silicas, asbestos, highly fluorinated polymers such as Teflon, etc.

For example, a capacitor employing tetrakis(o-biphenylyl) silicate is made up of alternate layers of metal foil such as aluminum or tin foil separated by mica. Thus a thin, aluminum foil (about 0.0003" in thickness) is covered with a paste of powdered mica and tetrakis(o-biphenylyl) silicate, and another sheet of the foil is placed thereon so that the two sheets of metal foil are separated from each other by the paste. This is then covered by another layer of the paste and the stack of alternating layers of metal foil and paste thus obtained is wound into a cylindrical roll. This is placed into a container, and at this point electrical connecting means, e.g., wire or bar conductors, depending upon the size of the assembly, may be connected to the metal foil in known manner. After drying, preferably in a heated vacuum oven, tetrakis(o-biphenylyl) silicate is added in a quantity sufficient to fill all interstices. The container is then sealed.

Alternatively, and particularly in the manufacture of large items, sheets of conducting metal are arranged alternately with sheets of mica at spaced distances from each other within the container, one of the isomeric tetrakis(biphenylyl) silicates is added, and the container is sealed.

In the manufacture of a transformer, the core with electrical windings or coil, is positioned within the housing or tank, lead-in bushings are provided and suitable leads are connected to the coil assembly, and tetrakis(o-biphenylyl) silicate is added to the housing, immersing the components contained therein.

In a cable suitable for high temperatures, the conducting elements are insulated by asbestos felt which has been impregnated with tetrakis(m-biphenylyl) silicate contained in a casing of tetrafluorethylene polymer, e.g., Teflon, or another suitable, flexible, heat-resistant material.

The isomeric tetrakis(biphenylyl) silicates are useful as liquid encapsulating materials for electrical components generally. They are non-hygroscopic, unaffected by air, stable over wide temperature ranges, and non-corrosive to the electrical components. Hence, they serve not only as liquid coolants and insulating media but also as encapsulating or potting means. This insures the continued high quality of the electrical apparatus, even though it has been repeatedly used and stored for long periods of time.

In the manufacture of electrical apparatus there may be employed as dielectric medium or as potting agent one of the isomeric tetrakis(biphenylyl) silicates, or a mixture thereof. Also, one or more of said isomers may be combined with other dielectric agents or potting agents, depending upon the anticipated conditions of operation or storage. They may be combined with mica or up to 50% by weight of one or more other dielectric media, e.g., liquid petroleum hydrocarbons, the partially chlorinated biphenyls, the chlorinated terphenyls, the chlorinated paraffinic hydrocarbons, chlorinated diphenylethane, the tetrahydrofurfuryl ethers of the chlorophenols, trichlorobenzene, etc. However, for use in the higher temperature ranges, admixture of the terphenyls with the halogenated compounds is generally unadvisable, and when prolonged storage is contemplated, admixture with the readily oxidizable paraffinic hydrocarbons is not generally recommended.

Although several specific types of electrical apparatus comprising the tetrakis(biphenylyl) silicates have been disclosed by way of illustrating the principles of the present invention, additional applications of these principles within the scope of the appended claims will be readily apparent to those skilled in the art.

What we claim is:

1. Electrical apparatus comprising, in combination, metallic conducting elements disposed in spaced relationship to each other and exhibiting, during operation of the apparatus, a difference in potential therebetween, and tetrakis(biphenylyl) silicate interposed between said elements and isolating them from each other.

2. A capacitor comprising conducting elements and tetrakis(biphenylyl) silicate associated with each of the elements and isolating them from each other.

3. A transformer comprising a core with electrical windings positioned in a housing and encompassed by tetrakis(biphenylyl) silicate contained in said housing.

4. Electrical apparatus comprising, in combination, metallic conducting elements disposed in spaced relationship to each other and exhibiting, during operation of the apparatus, a difference in potential therebetween, and tetrakis(o-biphenylyl) silicate interposed between said elements and isolating them from each other.

5. A capacitor comprising conducting elements and tetrakis(o-biphenylyl) silicate associated with each of the elements and isolating them from each other.

6. A transformer comprising a core with electrical windings positioned in a housing and encompassed by tetrakis(o-biphenylyl) silicate contained in said housing.

References Cited in the file of this patent

UNITED STATES PATENTS

| | | |
|---|---|---|
| 2,077,429 | McMahon | Apr. 20, 1937 |
| 2,572,808 | Jackson | Oct. 23, 1951 |
| 2,584,334 | Da Fano | Feb. 5, 1952 |
| 2,900,345 | Heininger | Aug. 18, 1959 |